US007827550B2

(12) United States Patent
Daruwala et al.

(10) Patent No.: US 7,827,550 B2
(45) Date of Patent: Nov. 2, 2010

(54) METHOD AND SYSTEM FOR MEASURING A PROGRAM USING A MEASUREMENT AGENT

(75) Inventors: Burzin Daruwala, Aloha, OR (US); Carlos Rozas, Portland, OR (US); Mona Vij, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1475 days.

(21) Appl. No.: 11/206,547

(22) Filed: Aug. 17, 2005

(65) Prior Publication Data

US 2007/0043896 A1    Feb. 22, 2007

(51) Int. Cl.
G06F 9/455 (2006.01)
G06F 11/30 (2006.01)
G06F 11/00 (2006.01)

(52) U.S. Cl. .............................. 718/1; 713/187; 726/23

(58) Field of Classification Search ................ 718/1; 713/187; 726/23
See application file for complete search history.

(56) References Cited

U.S. PATENT DOCUMENTS 5,987,557 A * 11/1999 Ebrahim ................. 710/200
7,467,370 B2 * 12/2008 Proudler et al. ............ 717/100
7,565,522 B2 * 7/2009 Sastry et al. .................. 713/2
2001/0037450 A1 * 11/2001 Metlitski et al. ........... 713/152
2005/0132122 A1 * 6/2005 Rozas ....................... 711/100

OTHER PUBLICATIONS

Tal Garfinkel, Ben Pfaff, Jim Chow, Mendel Rosenblum, Dan Boneh; "Terra: a virtual machine-based platform for trusted computing". Proceedings of the nineteenth ACM symposium on Operating systems principles, Oct. 19-22, 2003. Bolton Landing, NY, USA, pp. 193-206.*
Starr Anderson, Vincent Abella; "Part 3: Memory Protection Technologies"; Microsoft TechNet; Aug. 9, 2004; Updated: Sep. 15, 2004; <http://technet.microsoft.com/en-us/library/bb457155.aspx>; Accessed: Nov. 24, 2009.*

* cited by examiner

Primary Examiner—Meng-Ai An
Assistant Examiner—Nikhil Krishnan
(74) Attorney, Agent, or Firm—Blakely, Sokoloff, Taylor & Zafman LLP

(57) ABSTRACT

Executing a monitor, in a memory region of a platform protected from access by programs executing in a partition provided on the platform, and the monitor executing an agent to measure a program executing in the partition to obtain a measurement.

25 Claims, 4 Drawing Sheets

METHOD AND SYSTEM FOR MEASURING A PROGRAM USING A MEASUREMENT AGENT

BACKGROUND

A processor based system, alternatively termed a platform herein, using a processor such as an Intel® Pentium 4 processor may be a personal computer, server computer, workstation, personal desktop assistant (PDA), game system, set top box, or smart mobile phone, among others. In many such systems, an operating system such as Linux or a Microsoft Windows™ operating system is often used to manage and provide access to the system's resources and to allow other programs to access those resources and use the system. It may be necessary to provide an application or service that uses the system with a level of trust in the operating system. One known method of establishing such a level of trust is for the application or service to measure the operating system in one of many known ways, for example by obtaining an MD5 checksum of the text of the operating system kernel in memory, and to compare the value obtained by measuring the operating system to an expected value. An ideal measuring method would generally need to be aware of the organization of the OS and its layout in memory to be most accurate. The same general principle may be applied to establishing trust in any program or component of a program such as a driver or kernel module of the operating system.

In order to prevent vulnerabilities or an existing corruption of an operating system from affecting the measurement, a measuring agent outside the operating system may be preferred. An issue when measuring an operating system and storing the data for later use by an application or agent seeking to establish a trust level in the OS is the security of the stored measurement itself, if a malicious hardware agent or software agent is able to modify the measurement while or after it is made, it may corrupt the trust establishment process.

Virtualization is a technique that enables a processor based host machine with support for virtualization in hardware and software, or in some cases, in software only, to present an abstraction of the host, such that the underlying hardware of the host machine appears as one or more independently operating virtual machines. Each virtual machine may therefore function as a self-contained platform. Often, virtualization technology is used to allow multiple programs, termed guests, such as operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems provide guest software operating in a virtual machine with a set of resources (e.g., processors, memory, IO devices) and may map some or all of the components of a physical host machine into the virtual machine, or create fully virtual components. The virtualization system may thus be said to provide a virtual bare machine interface to guest software.

More generally, systems may provide the ability for different programs to execute in isolated regions of memory and limited or no access to the memory in which data or code related to other programs resides. While such partitioned systems are provided by virtualization, other simpler forms of partitioned systems exist. For one example, a separate system management mode may exist in which a set of system management programs and data may operate in space that is inaccessible to the operating system or other programs of the system. Other forms of partitioned systems are known in the art.

Security enhanced hardware platforms are known in the art. A platform feature related to security and to this application is the ability to store data in a trusted platform module. A trusted platform module may be used to provide attestation and sealed storage for data in security related applications. Thus, an agent may retrieve data from a TPM that is attested, thus establishing the identity of the platform to the agent. Furthermore, a TPM generally tracks all changes to the data and therefore may be queried to ensure that no tampering has taken place between the time data was stored in the TPM and the time at which it was requested by an agent.

Other secure platform features may include the ability to protect system memory, or portions thereof, from direct access bypassing a processor; and ability to set read, write or execute restrictions on regions of system memory.

DETAILED DESCRIPTION

In some embodiments, virtualization systems may include a virtual machine monitor (VMM) which controls the host machine. The VMM provides guest software operating in a virtual machine (VM) with a set of resources such as processors, memory, and IO devices. The VMM may map some or all of the components of a physical host machine into the virtual machine, and may create fully virtual components, emulated in software in the VMM, which are included in the virtual machine (e.g., virtual IO devices). The VMM may use facilities in a hardware virtualization architecture to provide services to a virtual machine and to provide protection from and between multiple virtual machines executing on the host machine.

Figure 1:
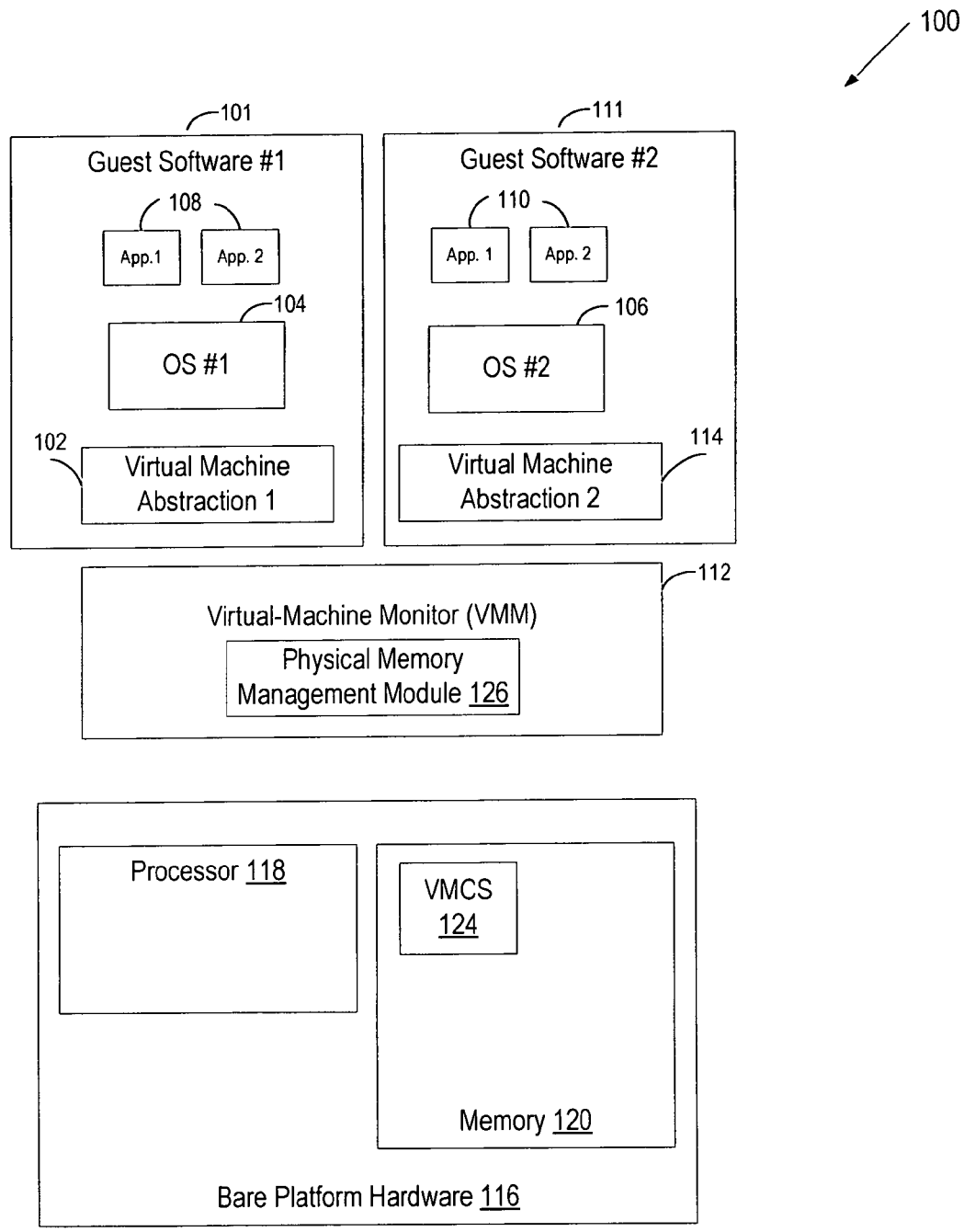
FIG. 1 is a high level block diagram of a virtualized environment in one embodiment.

FIG. 1 illustrates one embodiment of a virtual-machine environment 100. In this embodiment, a processor-based platform 116 may execute a VMM 112. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. In some instances, the operating system and the application may not exist as independent entities, but rather, functionality that would otherwise be provided by an operating system may be provided by a library which is linked with an application. Thus, there may only be a single executable object which is executed in the Virtual Machine. Alternatively, for example, the VMM 112 may be run within, or using the services of, another VMM. VMMs may be implemented, for example, in hardware, software, firmware or by a combination of various techniques in some embodiments.

The platform hardware 116 may be a personal computer (PC), mainframe, handheld device such as a personal digital assistant (PDA) or "smart" mobile phone, portable computer, set top box, or another processor-based system. The platform hardware 116 includes at least a processor 118 and memory 120. Processor 118 may be any type of processor capable of executing programs, such as a microprocessor, digital signal processor, microcontroller, or the like. The processor may include microcode, programmable logic or hard coded logic for execution in embodiments. Although FIG. 1 shows only one such processor 118, there may be one or more processors in the system in an embodiment. Additionally, processor 118 may include multiple cores, support for multiple threads, or the like. Memory 120 can comprise a hard disk, a floppy disk, random access memory (RAM), read only memory (ROM), flash memory, any combination of the above devices, or any other type of machine medium readable by processor 118 in various embodiments. Memory 120 may store instructions and/or data for performing program execution and other method embodiments.

The VMM 112 presents to guest software an abstraction of one or more virtual machines, which may provide the same or different abstractions to the various guests. FIG. 1 shows two virtual machines, 102 and 114. Guest software such as guest software 101 and 111 running on each virtual machine may include a guest OS such as a guest OS 104 or 106 and various guest software applications 108 and 110. Guest software 101 and 111 may access physical resources (e.g., processor registers, memory and I/O devices) within the virtual machines on which the guest software 101 and 111 is running and to perform other functions. For example, the guest software 101 and 111 expects to have access to all registers, caches, structures, I/O devices, memory and the like, according to the architecture of the processor and platform presented in the virtual machine 102 and 114.

In some environments termed "paravirtualized" environments, the virtual machine abstraction may be a provided by set of software enhancements rather than by specialized hardware or low level software. In such environments, a guest may operate with some knowledge of the underlying virtualization, as opposed to a "pure" virtualized environment which is essentially invisible to guests.

In one embodiment, the processor 118 controls the operation of the virtual machines 102 and 114 in accordance with data stored in a virtual machine control structure (VMCS) 124. The VMCS 124 is a structure that may contain state of guest software 101 and 111, state of the VMM 112, execution control information indicating how the VMM 112 wishes to control operation of guest software 101 and 111, information controlling transitions between the VMM 112 and a virtual machine, etc. The processor 118 reads information from the VMCS 124 to determine the execution environment of the virtual machine and to constrain its behavior. In one embodiment, the VMCS 124 is stored in memory 120. In some embodiments, multiple VMCS structures are used to support multiple virtual machines, and in yet other embodiments there may be no VMCS structures available.

Access to certain resources by guest software (e.g., 101, including guest OS 104 and application 108) may generate virtualization events, causing transfer of control to the VMM. In these cases, the VMM 112 facilitates functionality desired by guest software while retaining ultimate control over these resources. For example, access to memory management control registers of the processor may generate a virtualization event. Further, each guest software 101 and 111 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 112 to ensure proper operation of virtual machines 102 and 114 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

Figure 2:
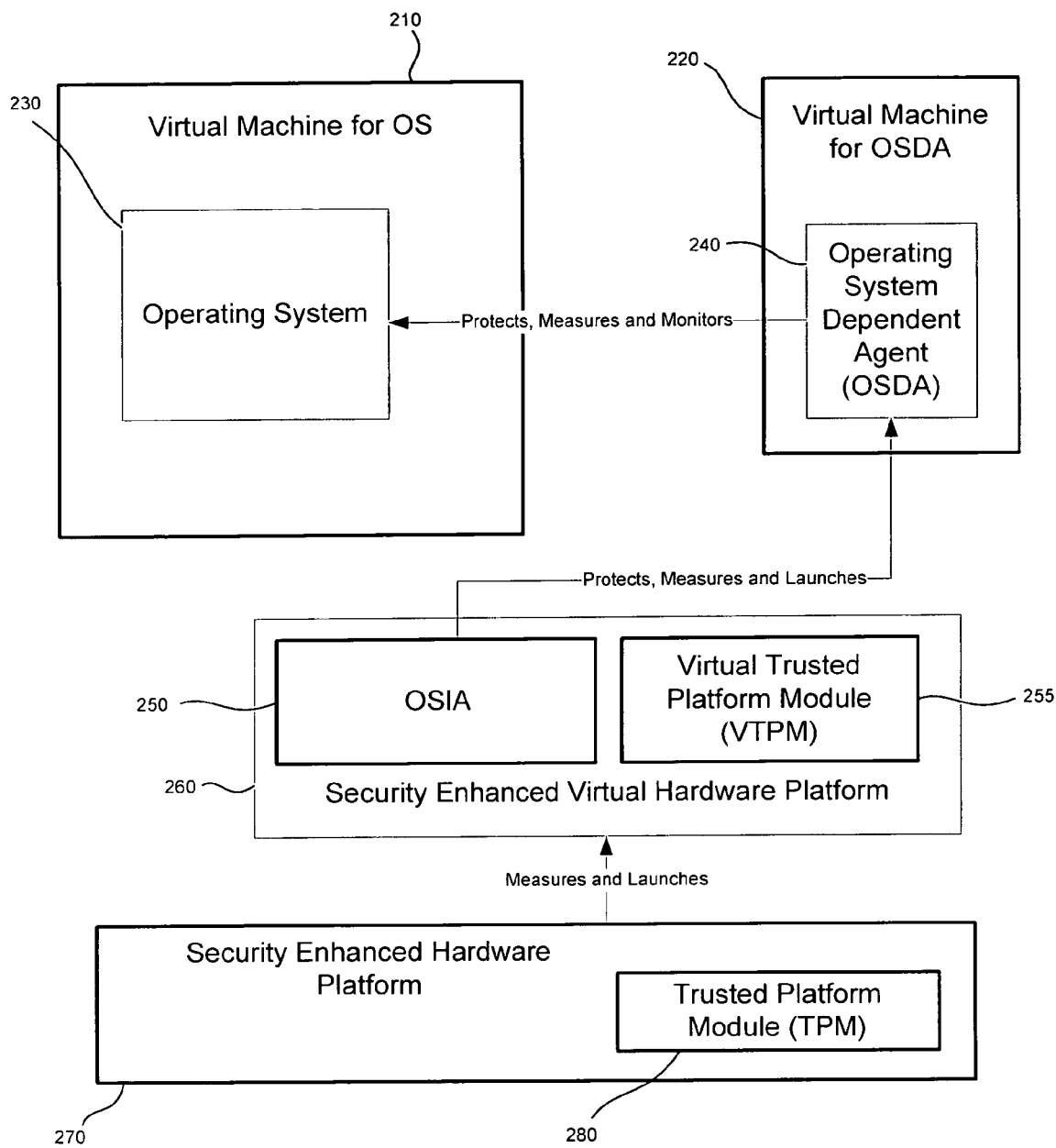
FIG. 2 is a high level block diagram of the major components in one embodiment.

FIG. 2 depicts a high level organization of one embodiment, showing the major components of the embodiment. These are, a security-enhanced hardware platform 270 including a capability to provide a trusted platform module (TPM) such as 280; a user or operating system virtual machine (VM) 210 within which executes the operating system 230 and user programs supported by the operating system; a specialized virtual machine monitor supporting measurement of any environment executing within the VM e.g. an OS an operating system and termed a security-enhanced virtual hardware platform (SEVHP) 260 that provides an independent platform for the measurement of an operating system, including operating system independent software (OSIA) 250 to launch and support a measuring agent, and a virtual trusted platform module (VTPM) 255 which provides virtualized access to the TPM 280; and a third virtual machine 220 dedicated to providing a platform for an operating system dependent agent (OSDA) 240 which performs the actual measurement.

In this embodiment the TPM 280 and VTPM 255 (referred to generically in this paragraph as a TPM or TPMs) provide two primary sets of services. The first, sealed storage, is the ability of TPMs to encrypt data and conditionally decrypt data that is stored in the TPMs. The decryption of encrypted data is only performed when the platform on which a TPM is provided and the entity that requests the decrypted data meet certain criteria. In one embodiment, this may include the configuration of a set of platform configuration registers. The second service is attestation. This includes the cryptographic signature of the data stored in the TPMs with a cryptographic key and the provision of the signature to entities requesting the data so that the entity may verify that the data was sourced from a TPM using a known public key associated with the platform and the TPM.

The figure also depicts the general flow of invocation and operations that occur in this embodiment to measure and protect an operating system. First, the hardware platform 270 measures and launches the SEVHP 260. The SEVHP then launches the user VM 210 and the OS 230 in this embodiment. On receiving a request, typically from a user, to establish trust in the operating system, the SEVHP then transfers control to an OS-independent processing module termed the OSIA 250, which in turn initializes a new virtual machine 220 dedicated to the operation of the OSDA 240. The OSIA then loads the OSDA into the VM 220, measures the OSDA, protects it from malicious interference, and launches it. The OSDA in turn protects the OS from interference and measures it. Each measurement is stored in the VTPM 255 for use by any agent or entity that may need to compare it to a known value to establish a level of trust in the measured item.

It should be understood that many variations of the high level organization depicted in FIG. 2 are possible. In some embodiments, there may be more than one, or no, trusted platform modules. In others, the user VM 210 may be used to execute an application other than an operating system, such as for example a dedicated game or other program; and the OSDA may measure this application instead of measuring an operating system. In some embodiments, the SEVHP may be implemented as an independent monitor running directly on hardware and separate from the VMM and be dedicated solely to the security related aspects of the embodiment, while the separate VMM may in such a case handle only the management of virtualization. The OSIA may not be a separate entity and in fact the SEVHP in some embodiments may essentially be identical or equivalent to the OSIA. In some embodiments, the measurement of the OSDA may be omitted, as may the measurement of the SEVHP. In others, protection of the OSDA or the OS may be omitted. In some other embodiments, the SEVHP may measure the OS, or another guest application in the user VM directly at launch time rather than waiting for a request to begin the measurement process. Parts of the SEVHP like the VTPM or the OSIA measurement functionality may be implemented in hardware. In some instances, instead of a VMM, a partition manager may be used (implemented in hardware or software) with the resulting SEHVP functionality implemented within the partition manager. The OSDA may also be implemented but be present as a new mode of a "virtual" or "real" processor instead of as a separate virtual machine. As one of ordinary skill in the art would appreciate these and many other combinations of the above set of functions are possible in various embodiments.

Figure 3:
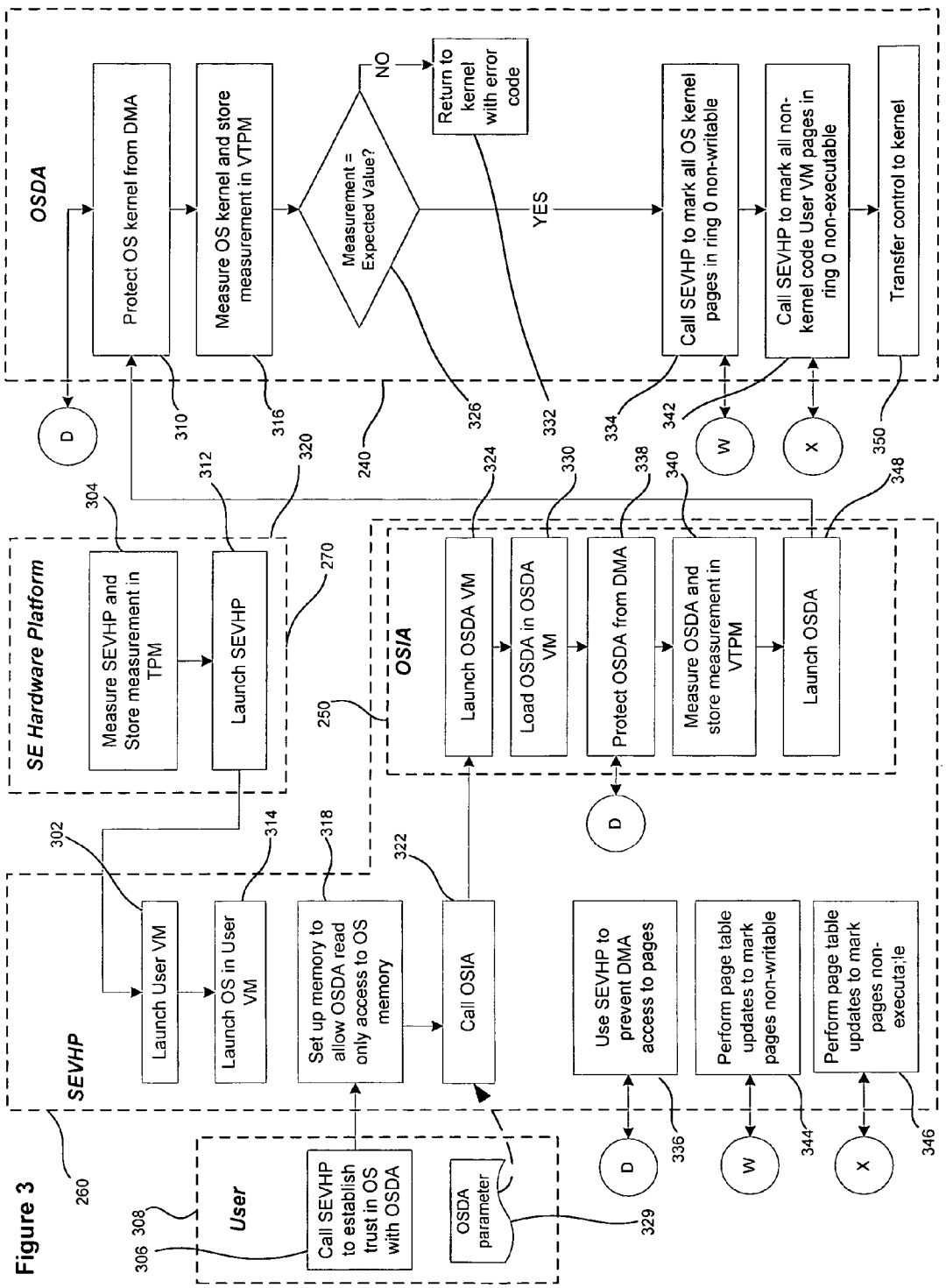
FIG. 3 is a high level flow diagram of the operation of one embodiment.

FIG. 3 further elaborates on the high level outline depicted above in FIG. 2. Processing is depicted in a flowchart fashion, but further broken down by entity. The entities within which processing occurs in the figure are the same ones previously introduced and are referenced by the same reference labels: security enhanced hardware platform 270, SEVHP 260, OSIA 250, and OSDA 240. Processing begins at boot in this embodiment when hardware platform 270 initializes, measures a secure VMM or SEVHP 304, storing the measurement in the platform TPM 280 and launches the SEVHP at 312. After the SEVHP initializes, it launches the guest or user VM at 302 in which an operating system is to execute. The OS is launched, 314, and the OS has control and executes runs normally until a user or other entity 308 requests that the system establish a trust level in the OS, 306, by calling an appropriate entry point in the SEVHP. In some embodiments, alternatively, the OS may be measured prior to launch. To enable measurement of the OS, the SEVHP may be passed an operating system specific or dependent measuring agent, OSDA 329. In some embodiments, the OSDA may be pre-stored or pre-configured and merely be accessed by the SEVHP based on the call. On receiving the call, the SEVHP in this embodiment sets up the memory of the hardware platform, to which it has privileged access, to allow the OSDA read access to the memory in which the OS resides within the user VM, at 318. The SEVHP then calls the OSIA, passing along the OSDA as a parameter, 322.

The OSIA 250, which executes as a component of the SEVHP, then launches, 324, a new VM, the OSDA VM, 220. It loads the OSDA in the OSDA VM at 330, and protects it from direct memory access (DMA) at 338. To protect the OSDA from DMA, the OSIA invokes a function of the SEVHP 336. The SEVHP has privileged access to the memory of the hardware platform because of its special status as the VMM of the system in this embodiment, and the underlying hardware platform in the embodiment includes a set of security features that make it possible for a privileged process to disable DMA. In general, even if the SEVHP is not running as a VMM in another embodiment, it has sufficient privileges to DMA protect relevant portions of the host's physical memory. If DMA is attempted into a location so protected, in one embodiment, an interrupt may be generated, or other error handling actions taken. Therefore it is possible to prevent agents other than the processor from modifying selected pages in memory and in this instance, the pages into which the OSDA is loaded are so protected at 338 by the functionality available at 336. The OSIA next measures the OSDA and stores the measurement at 340 in the VTPM 255. The OSDA is then launched, 348.

The OSDA is a specifically tailored program that is aware of the layout and data structures of the OS launched by the SEVHP at 314. In this embodiment, it is assumed that the OS has a core set of components, such as data structures and code modules, termed a kernel, such as for example a Linux operating system kernel. Furthermore, it may be assumed that a privileged portion of system memory is allocated solely for use of the OS, and the OS has executing processes and data structures in this area, termed ring-0. On launch, the OSDA protects any part of ring-0 occupied by the kernel from DMA at 310 using SEVHP-provided functionality, 336. In an exemplary case where the OS is Linux, the OSDA then measures the text segment of the kernel in ring-0 at 316, and stores the measurement in the VTPM 255 of the hardware platform. In an embodiment where a request to establish trust in the kernel has been made, the OSDA then executes to compare the measurement just made with an expected value at 326.

If the values match, the OSDA at 334 then uses another special function of the SEVHP provided at 344, that marks pages as non-writable. In a manner similar to the No-DMA functionality discussed previously, pages marked as non-writable by the SEVHP are protected from any write access. Any process or entity attempting to write to these pages would cause the SEVHP to intercept the attempt and generate an interrupt or another error handler. Once the kernel pages in ring-0 are marked non-writable, the OSDA may in this embodiment, take a further protective action: the OSDA marks non-executable portions of the kernel such as data structures like queues and tables, non-executable in the SEVHP as at 342 by calling the SEVHP at 346. The SEVHP, as before, having privileged access to the underlying hardware platform, generates an error trap or takes other action as desired if a page that is marked as non-executable at 346 is accessed by an attempt to execute code on the page. Once the OS is protected from DMA, write access, and from the execution of code in unexpected locations of ring-0, the OSDA allows the kernel to resume with no errors, thus establishing a trust level for the user at 350.

If on the other hand, the measurement fails to match the expected value, in some embodiments, the OSDA may exit with an error code returned to the kernel at 332. In another embodiment, if an expected value is not available, the OSDA may go ahead and complete measuring and protecting the OS, and rely on a later call by a remote entity to ascertain the validity of the given OSDA.

Many optional functions and features are depicted for a full description of the embodiment depicted in FIG. 3. As previously indicated, the user may not call the SEVHP to establish trust, the SEVHP may simply do so automatically as part of a boot process or in response to another type of event such as a detected intrusion. The SEVHP may or may not itself be a VMM. The SEVHP is shown in the figure as incorporating an OSIA. In some embodiments the structure and organization of programs may differ and the OSIA may be a separate entity, or be indistinguishable from the SEVHP where the SEVHP in such embodiments is not managing virtualization. Some or all of the protection schemes depicted as functionality in the SEVHP at 336, 344 and 346 described may be omitted in some embodiments. In others different protection schemes for kernel protection may be used. In some embodiments, the OSDA may not be launched in a separate VM, and may be part of the SEVHP. In others the OSDA may not be measured or protected. While an OS is measured in the depicted embodiment, other programs may also be measured. The actual actions taken after measuring the guest may differ from those shown. One of ordinary skill in the art will appreciate that these and many other variations are possible.

Figure 4:
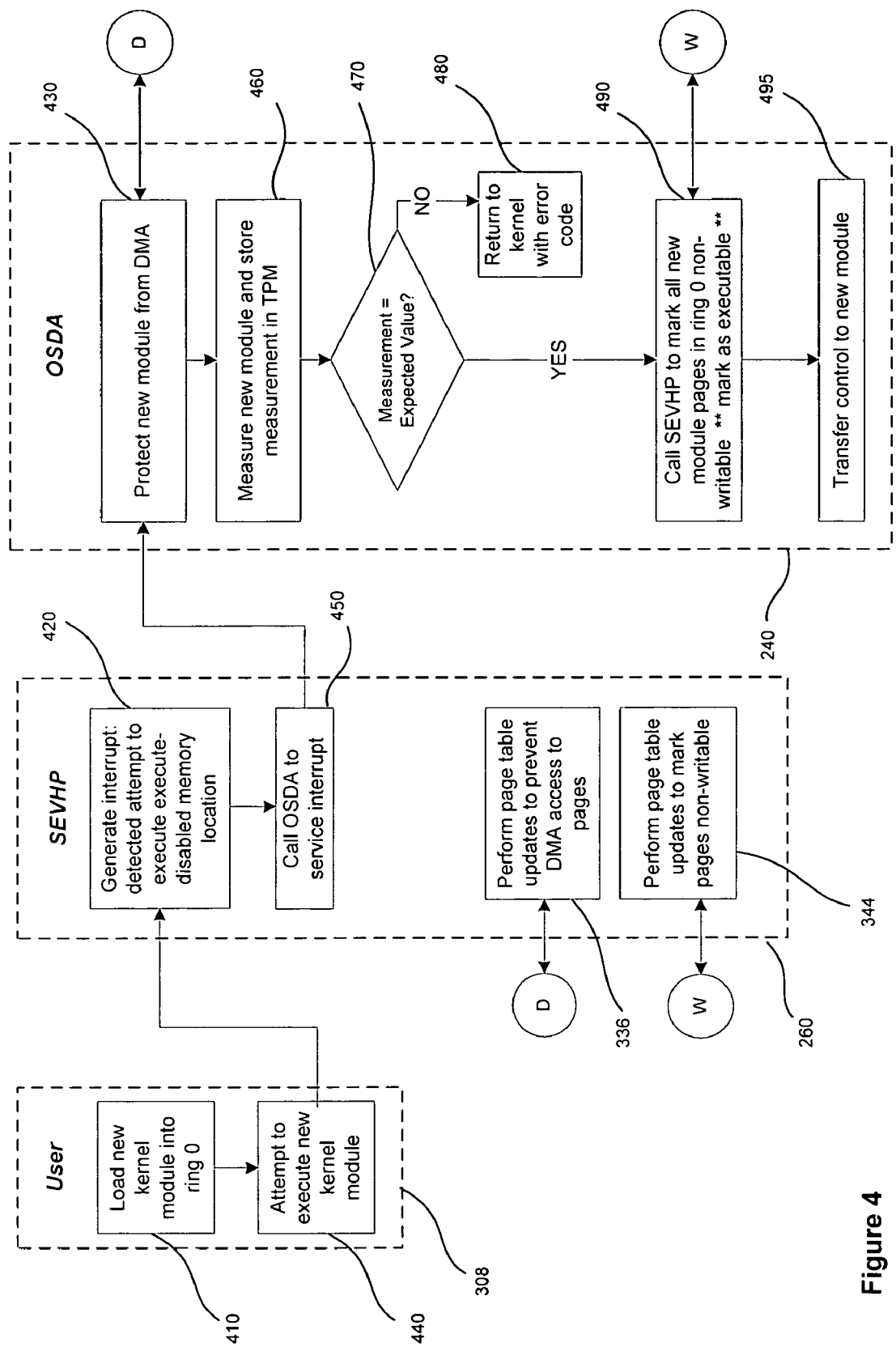
FIG. 4 is a high level flow diagram of the operation of one embodiment.

FIG. 4 depicts the operation of the embodiment previously described with reference to FIG. 3 when a new core component is added to an operating system to enhance or alter its functionality. For example, in the case of Linux, a new module may be added to the kernel. Because a Linux instance running in a user VM protected as described above would not be modifiable without a fault occurring, a process to handle desired module insertions is depicted in the figure. As shown, a new module is inserted by the user 308 at 410 and is then loaded by the kernel into an unused portion of ring-0. As was discussed above, the portions of ring-0 in which kernel components do not reside are writeable, but not executable. The user or the OS then attempts to call or execute code in the inserted module at 440. This generates an interrupt in this embodiment, which is trapped by the SEVHP 260 at 420 which in turn passes it to the OSDA at 450. The OSDA 240 first protects the new module from DMA as previously described with reference to the OS, at 430 using the functionality of the SEVHP provided at 336. It then measures and stores the measurement of the new module, 460 and checks the value of the measurement. If the value meets expectations, the OSDA then protects the module from write actions, 490, using the SEVHP functionality discussed above at 344, marks the module pages as executable, and transfers control to it, 495. Otherwise, the OSDA generates an error code, 480.

Once more, it should be clear that the above exemplary embodiments may be varied substantially. In other embodiments, the OS may not be Linux, and the terms "ring-0" "kernel" and "module" may not apply or be substituted by like terms, including for example "core" "system," or "privileged" memory for ring-0; core or basic layer or another term for "kernel;" and "component," "unit," "dll," and "driver" among many others for "module", among many others. As before not all checks and protections may be performed for each type of module or component insertions, and many other embodiments are possible.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

The invention claimed is:

1. A method comprising:
   executing a monitor, in a memory region of a platform protected from access by a program executing in a partition provided on the platform, the monitor including a virtual machine monitor (VMM), the program including an operating system, the partition including a virtual machine;
   the VMM receiving a program specific measuring agent from a request to measure the pro ram, the program specific measuring agent including an operating system dependent agent (OSDA) that is aware of a layout and data structures of the operating system;
   the program specific measuring agent disabling a direct memory access (DMA) to memory locations in which the program is loaded, disabling the DMA before measuring the program; and
   the VMM executing the program specific measuring agent to measure the program executing in the virtual machine to obtain a measurement.

2. The method of claim 1 further comprising:
   the VMM launching the operating system in the virtual machine;
   wherein the VMM receiving the program specific measuring agent to measure the program comprises:
      providing the OSDA to the VMM and calling the VMM to run the OSDA on the operating system;
   wherein the VMM executing the program specific measuring agent to measure the program comprises:
      the OSDA measuring the operating system to obtain a measurement of the operating system.

3. The method of claim 2 further comprising:
   a logic of the platform measuring the VMM to obtain a measurement of the VMM and storing the measurement of the VMM; and
   the VMM measuring the OSDA to obtain a measurement of the OSDA and storing the measurement of the OSDA.

4. The method of claim 2 wherein the OSDA measuring the operating system further comprises:
   the VMM loading the OSDA into an agent virtual machine; and
   launching the OSDA in the agent virtual machine.

5. The method of claim 1, wherein the program specific measuring agent disabling the DMA to the memory locations in which the program is loaded comprises disabling the DMA to substantially all the memory locations of the platform in which core components of the program are loaded, prior to measuring the program.

6. The method of claim 2, wherein the platform further comprises:
   a first logic function to prevent modification of a first memory location in which core non-modifiable components of the operating system are loaded;
   a second logic function to prevent execution of non-executable components of the operating system loaded at a second memory location; and
   wherein the OSDA measuring the operating system further comprises:
      the OSDA comparing the measurement of the operating system to a predetermined value for the measurement of the operating system; and
      if the comparison yields a first logical value, the OSDA preventing write access to the first memory location and execution access to the second memory location.

7. The method of claim 2, wherein the platform further comprises virtualization support in hardware, the method further comprising:
   the VMM managing virtualization;
   the VMM controlling the DMA to a first memory in which the OSDA is loaded; and
   the VMM providing the OSDA access to a second memory in which core components of the operating system are loaded.

8. The method of claim 2 further comprising:
   the OSDA storing the measurement in a virtual trusted platform module of the VMM (VTPM);
   the VTPM encrypting the measurement; and
   the VTPM storing the encrypted measurement.

9. The method of claim 8, wherein the VTPM further comprises:
   receiving a request for the measurement from a requestor;
   validating a configuration information of the requester; and
   decrypting and providing the measurement in response to the request if the configuration information is valid.

10. The method of claim 8, wherein the VTPM further comprises:
    computing a cryptographic signature for the measurement;
    storing the cryptographic signature for the measurement;
    receiving a request for attestation to the measurement; and
    providing the cryptographic signature in response to the request.

11. The method of claim 8, wherein the VTPM is an interface to a hardware trusted platform module providing at least an attestation service and a sealed storage service.

12. The method of claim 7 wherein the platform further comprises a hardware support for measurement of measuring program components in memory.

13. The method of claim 6 further comprising:
    the VMM intercepting an interrupt generated by a hardware platform in response to an attempt to execute a new executable component of the operating system loaded in the second memory location;
    the VMM calling the OSDA to service the interrupt;
    the OSDA disabling the DMA to substantially all memory locations in which the new executable component is loaded;
    the OSDA measuring the new executable component and storing a measurement of the new executable component in a VTPM;
    the OSDA comparing the measurement of the new executable component to a predetermined value for the measurement of the new executable component and if the comparison yields a first logical value, the OSDA preventing write access to substantially all memory locations in which the new executable component is loaded; and
    the OSDA transferring control to the new executable component.

14. A system comprising:
    a processor;
    a memory communicatively coupled to the processor;
    a partition of the system comprising a program loaded in a first region of the memory and executable on the processor, the partition including a virtual machine, the program including an operating system;
    a second region of the memory protected from access by the program; and
    a program specific measuring agent loaded in the second region of the memory and executable in the second region of the memory to disable a direct memory access (DMA) to the first region of the memory having the program, disabling the DMA before measuring the program and to measure the program and to obtain a measurement, wherein the program specific measuring agent includes an operating system dependent agent (OSDA) that is aware of a layout and data structures of the operating system.

15. The system of claim 14, wherein the OSDA is to measure the operating system to obtain a measurement of the operating system; and the system further comprises:

a virtual machine monitor (VMM) to launch the operating system in the virtual machine; and the VMM to run the OSDA on the operating system.

16. The system of claim 15 further comprising:

a first logic to prevent modification of a first memory location of the system; and a second logic to prevent execution of non-executable components of the operating system at a second memory location, wherein the program specific measuring agent is further to compare the measurement of the operating system to a predetermined value for the measurement of the operating system and if the comparison yields a first logical value, to prevent write access to the first memory location and to prevent execution access to the second memory location.

17. The system of claim 15 further comprising:

a logic to support virtualization in hardware, and wherein the VMM is further to manage the virtualization;

control the DMA to memory in which the OSDA is loaded in an agent virtual machine; and provide the OSDA access to memory in which the core components of the operating system are loaded in the virtual machine.

18. The system of claim 15 wherein the VMM further comprises:

a trusted platform module of the VMM (VTPM)

to compute a cryptographic signature for the measurement, to store the cryptographic signature for the measurement, to receive a request for attestation to the measurement, and to provide the cryptographic signature in response to the request; and wherein the OSDA is further to store the measurement in the VTPM.

19. The system of claim 18 further comprising a hardware support for measurement of program components in the memory.

20. The system of claim 18, wherein the VTPM is an interface to a hardware trusted platform module providing at least an attestation service and a sealed storage service.

21. A non-transitory machine readable medium having stored thereon data that when accessed by a machine causes the machine to perform a method comprising:

executing a monitor, in a memory region of a platform protected from access by a program executing in a partition provided on the platform, the monitor including a virtual machine monitor (VMM), the program including an operating system, the partition including a virtual machine;

the VMM receiving a program specific measuring agent from a request to measure the program, the program specific measuring agent including an operating system dependent agent (OSDA) that is aware of a layout and data structures of the operating system;

the program specific measuring agent disabling a direct memory access (DMA) to memory locations in which the program is loaded, disabling the DMA before measuring the program; and the VMM executing the program specific measuring agent to measure the program executing in the virtual machine to obtain a measurement.

22. The non-transitory machine readable medium of claim 21 wherein the method further comprises:

the VMM launching the operating system in the virtual machine, wherein the VMM receiving the program specific measuring agent to measure the program comprises:

providing the OSDA to the VMM and calling the VMM to run the OSDA on the operating system; and wherein the VMM executing the program specific measuring agent to measure the program comprises:

the OSDA measuring the operating system to obtain a measurement of the operating system.

23. The non-transitory machine readable medium of claim 21, wherein the program specific measuring agent disabling the DMA to the memory locations in which the program is loaded comprises disabling the DMA to substantially all memory locations of the platform in which core components of the program are loaded, prior to measuring the program.

24. The non-transitory machine readable medium of claim 22 wherein the platform further comprises:

a first logic function to prevent modification of a first memory location in which core non-modifiable components of the operating system are loaded;

a second logic function to prevent execution of non-executable components of the operating system loaded at a second memory location; and wherein the OSDA measuring the operating system further comprises:

the OSDA comparing the measurement of the operating system to a predetermined value for the measurement of the operating system; and if the comparison yields a first logical value, the OSDA preventing write access to the first memory location and preventing execution access to the second memory location.

25. The non-transitory machine readable medium of claim 22 wherein the platform further comprises virtualization support in hardware, the method further comprising:

the VMM managing virtualization;

the VMM controlling the DMA to a first memory in which the OSDA is loaded; and the VMM providing the OSDA access to a second memory in which core components of the operating system are loaded.

* * * * *

UNITED STATES PATENT AND TRADEMARK OFFICE
CERTIFICATE OF CORRECTION

| | | |
|---|---|---|
| PATENT NO. | : 7,827,550 B2 | Page 1 of 1 |
| APPLICATION NO. | : 11/206547 | |
| DATED | : November 2, 2010 | |
| INVENTOR(S) | : Daruwala et al. | |

It is certified that error appears in the above-identified patent and that said Letters Patent is hereby corrected as shown below:

In column 9, at line 13 delete, "pro ram" and insert -- program --.

In column 10, at line 32 after, -- for -- delete "measurement of".

Signed and Sealed this
Tenth Day of May, 2011

David J. Kappos
*Director of the United States Patent and Trademark Office*